(12) United States Patent
van Liempd et al.

(10) Patent No.: US 6,857,980 B2
(45) Date of Patent: Feb. 22, 2005

(54) TRANSVERSE ELEMENT HAVING A CONICAL NECK PORTION

(75) Inventors: Jeroen Herman van Liempd, Bavel (NL); Johannes Hendrikus van Lith, Berlicum (NL); Cornelis Johannes Maria van der Meer, Tilburg (NL)

(73) Assignee: Van Doorne's Transmissle B.V., Tilburg (NL)

( * ) Notice: Subject to any disclaimer, the term of this patent is extended or adjusted under 35 U.S.C. 154(b) by 176 days.

(21) Appl. No.: 10/167,248

(22) Filed: Jun. 11, 2002

(65) Prior Publication Data

US 2002/0187868 A1 Dec. 12, 2002

(30) Foreign Application Priority Data

Jun. 12, 2001 (NL) .......................................... 1018268

(51) Int. Cl.[7] ................................................. F16G 1/22
(52) U.S. Cl. ....................................................... 474/242
(58) Field of Search ................................. 474/242, 201, 474/244, 245

(56) References Cited

U.S. PATENT DOCUMENTS 3,949,621 A  4/1976  Beusink et al.
4,080,841 A  3/1978  Vollers

FOREIGN PATENT DOCUMENTS

| EP | 0 305 023 A1 | * | 3/1989 | ............. F16G/5/16 |
| EP | 0 468 770 A2 | * | 1/1992 | ............. F16G/5/16 |
| JP | 61070246 | | 4/1986 | |
| JP | 01015554 | | 1/1989 | |
| JP | 04083941 | | 3/1992 | |
| JP | 05-172188 A | * | 7/1993 | ............. F16G/5/16 |

\* cited by examiner

*Primary Examiner*—Marcus Charles
(74) *Attorney, Agent, or Firm*—Troutman Sanders LLP; Ryan A. Schneider

(57) ABSTRACT

A transverse element for a drive belt for a continuously variable transmission is disclosed. The drive belt comprises two endless carriers, wherein transverse elements are continuously arranged along the entire length of the carriers. The transverse elements are on both sides provided with recesses for at least partially receiving the carriers. A portion of the inner surface of a recess constitutes a supporting surface for supporting a carrier. The supporting surface is connected to a side surface of a neck portion of the transverse element, through a lower transition region. The neck portion comprises the portion of the transverse element being situated between the recesses. The neck portion tapers in the direction of the supporting surfaces.

8 Claims, 6 Drawing Sheets

TRANSVERSE ELEMENT HAVING A CONICAL NECK PORTION

CROSS-REFERENCE TO RELATED APPLICATION

This application claims priority to Dutch patent application No. 1018268 filed Jun. 12, 2001.

FIELD OF THE INVENTION

The present invention relates to a transverse element for a drive belt for a continuously variable transmission having two pulleys having an at least partially conical contact surface for pairwise enclosing of the drive belt, each pulley being composed of two pulley sheaves, the drive belt comprising two endless carriers and transverse elements which are placed against each other in axial direction of the drive belt, wherein the transverse elements on both sides are provided with a supporting surface for supporting a carrier, which supporting surface on the one side turns into a pulley sheave contact surface being designed to abut against a contact surface of a pulley sheave and on the other side into a side surface of a neck portion of the transverse element, through a transition region.

BACKGROUND AND SUMMARY OF THE INVENTION

Such a transverse element is generally known, and is designed for application in a drive belt for a continuously variable transmission. Such a drive belt comprises two bundles of endless bands being shaped like a closed loop, which function as carriers of a number of transverse elements. The transverse elements are continuously arranged along the entire length of the bands, in order for them to be able to transmit forces which are related to a movement of the drive belt during operation.

The transverse element is on both sides provided with recesses for at least partially receiving the bundles of bands. A portion of the inner surface of a recess forms a supporting surface for supporting a bundle of bands.

Furthermore, for the purpose of contact between the transverse elements and the pulley sheaves of the continuously variable transmission, the transverse elements on both sides are provided with pulley sheave contact surfaces which are divergent in the direction of the supporting surfaces.

A supporting surface is on the one side connected to a pulley sheave contact surface and on the other side to a side surface of a neck portion of the transverse element, through a transition region. The neck portion comprises the portion of the transverse element being situated between the recesses. Besides the neck portion, the transverse element comprises an inner portion and an outer portion, wherein the inner portion comprises the supporting surfaces and the pulley sheave contact surfaces. On application of the transverse element in a drive belt, the transverse element is positioned such that the inner portion is located at the inner circumference of the drive belt and the outer portion is located at the outer circumference of the drive belt.

A projection is arranged on a front surface of the outer portion, while a hole is arranged in a back surface of the outer portion. The positions and the dimensions of the projection and the hole are adapted to each other in such a way that the projection of a transverse element can be received by the hole of a subsequent transverse element. An important function of the projections and the holes is preventing a mutual displacement in transverse direction of subsequent transverse elements which are part of a drive belt.

The dimensions of the outer portion are also determined by the projection and the hole. The fact is, the projection and the hole are preferably formed in the outer portion with the help of a die and a corresponding mould during a manufacturing process for forming the transverse element, like the punching process. In the process, a certain surface surrounding the projection and the hole, which in this case is called the fixture surface, is necessary for obtaining a sufficiently strong die and mould and for sufficiently supporting the transverse element during the formation of the projection and the hole. Moreover, the transverse element needs to posses a certain strength being suitable for utilisation thereof in the drive belt.

As already noted in the above, the transverse element is designed for application in a drive belt for a continuously variable transmission. The continuously variable transmission can for example be designed to be build into a motor vehicle. It is therefore desired that the weight of the transverse element is a low as possible, while the transverse element has to be sufficiently strong to absorb the forces which occur during operation of the continuously variable transmission.

The present invention provides for weight-saving relative to the known transverse element. For this purpose, at least a portion of the neck portion of a transverse element according to the invention tapers towards the supporting surfaces.

The tapered layout of the neck portion results in the outer portion and the inner portion being able to be smaller, whereby the weight of the transverse element is lower relative to a known transverse element being provided with a neck portion, the side surfaces of which extend substantially parallel relative to each other. After all, the tapered layout is such that the neck portion is relatively large at the side of the outer portion. As a result, in the transverse element according to the invention, the projection and the hole can be displaced in the direction of the neck portion, relative to the known transverse element. The fixture surface being situated around the projection and the hole, which amongst others is necessary for being able to obtain a sufficiently strong die and mould and for being able to sufficiently support the transverse element during the formation of the projection and the hole, can then also be displaced in the direction of the neck portion, so that a portion of the outer portion can be removed. In order to guarantee the stability of the transverse element, a portion of the inner portion needs then also to be removed. The weight-saving is achieved, because the portion which is added to the neck portion is smaller than the total portion which can be removed at the outer portion and the inner portion.

It is noted that in JP04083941 a transverse element and a bundle of bands are being disclosed, wherein an angle is defined between a position of a standing side of the bundle of bands when this is in a normal position on the supporting surface of the transverse element, and a position of the standing side when the bundle of bands has undergone an angular displacement relative to the normal position. Alternatively, such angular displacement can be described as a rotation of the transverse element about the centre of its projection relative to the bundle of bands. In order to reduce the chance of occurrence of linear contact between a relatively sharp portion of the bundle of bands and the side surface of the neck portion of the transverse element in case of an angular displacement of the bundle of bands, the position of the side surface is adapted. The position is chosen to be such that on an angular displacement in transverse direction of the bundle of bands, contact between a standing side of the bundle of bands and the side surface of the neck portion of the transverse element can take place through a plane, whereby the chance of damage of the side surface is reduced. In this position, the side surface is at an angle with an imaginary line extending perpendicular relative to the supporting surface, which angle equals the angle being present between the bands at a maximum angular displacement in transverse direction and the supporting surface. Generally, this latter angle is approximately 1° to 2°. It will be clear that the maximum angular displacement of the bundle of bands is determined by the width and the height of the bundle of bands and the width and the height of the recess.

BRIEF DESCRIPTION OF THE DRAWINGS

The invention will be explained in more detail on the basis of the following description of a transverse element according to the invention with reference to the drawing, in which equal reference signs designate equal or similar parts, and in which.

DETAILED DESCRIPTION OF THE PREFERRED EMBODIMENTS

Figure 1:
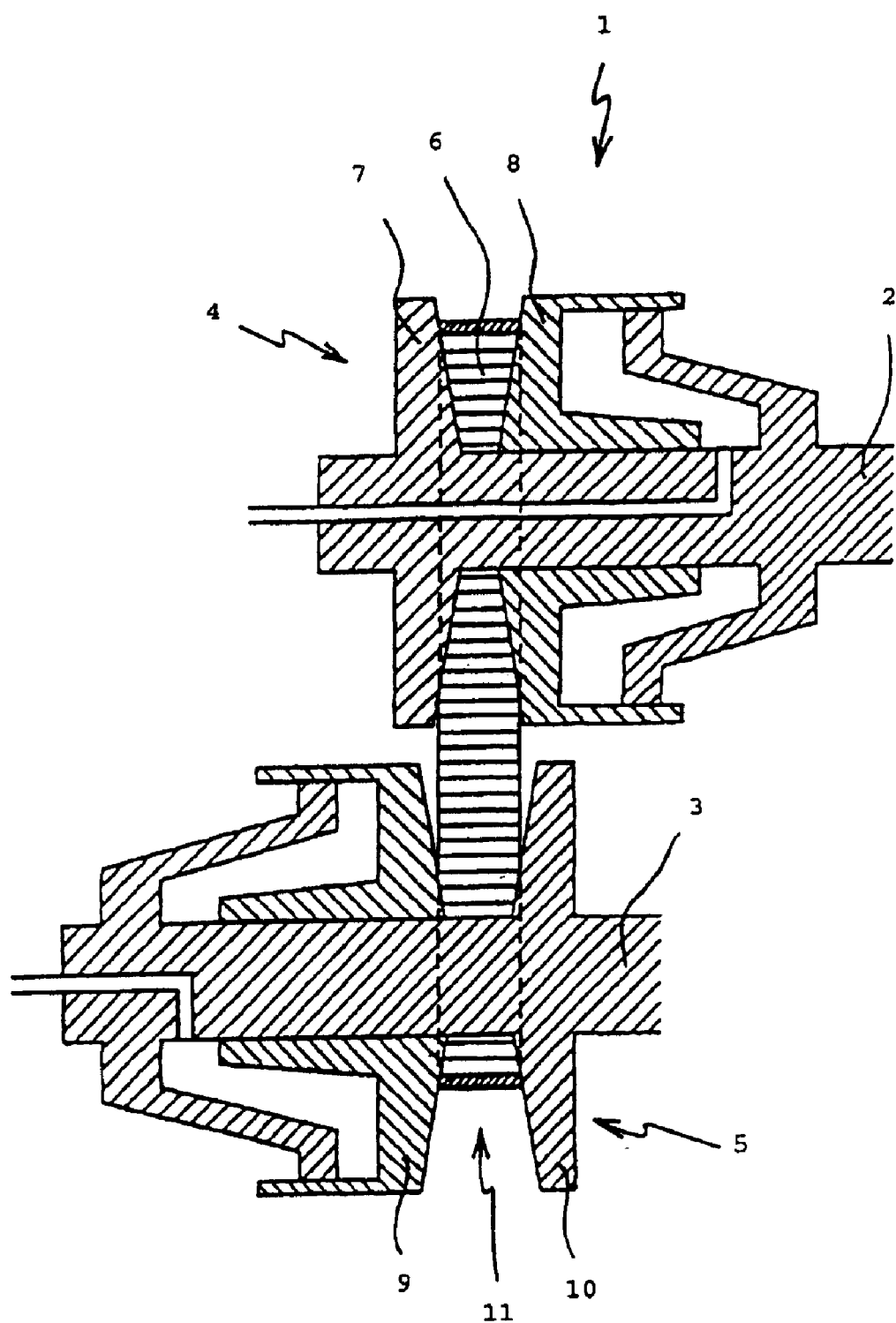
FIG. 1 is a diagrammatical transverse view of a continuously variable transmission having a drive belt.

FIG. 1 shows diagrammatically a continuously variable transmission, such as for utilisation in a motor vehicle.

The continuously variable transmission is indicated in general by the reference sign 1.

The continuously variable transmission 1 comprises two pulleys 4 and 5 being arranged on separate pulley shafts 2 and 3. An endless drive belt 6 being shaped like a closed loop is arranged around the pulleys 4 and 5 and serves for transmitting torque between the pulley shafts 2 and 3. The pulleys 4 and 5 are each provided with two conical sheaves 7 and 8 respectively 9 and 10, which collectively form a partially conical receiving groove 11 in which the drive belt 6 is received.

The transmission ratio of the continuously variable transmission I is determined by the ratio of the running radii of the drive belt 6 in the receiving groove 11 of the pulleys 4 and 5. The running radii can be varied by mutually displacing the pulley sheaves 7 and 8 respectively 9 and 10 with the help of displacing means, which are not depicted for the sake of the simplicity. For this purpose, at least one of the pulley sheaves 7 and 8 respectively 9 and 10 is arranged in an axially movable manner. For the purpose of transmitting torque between the pulley shafts 2 and 3, the drive belt 6 is clamped inside the receiving groove 11 of the pulleys 4 and 5 with a certain clamping force.

Figure 2:
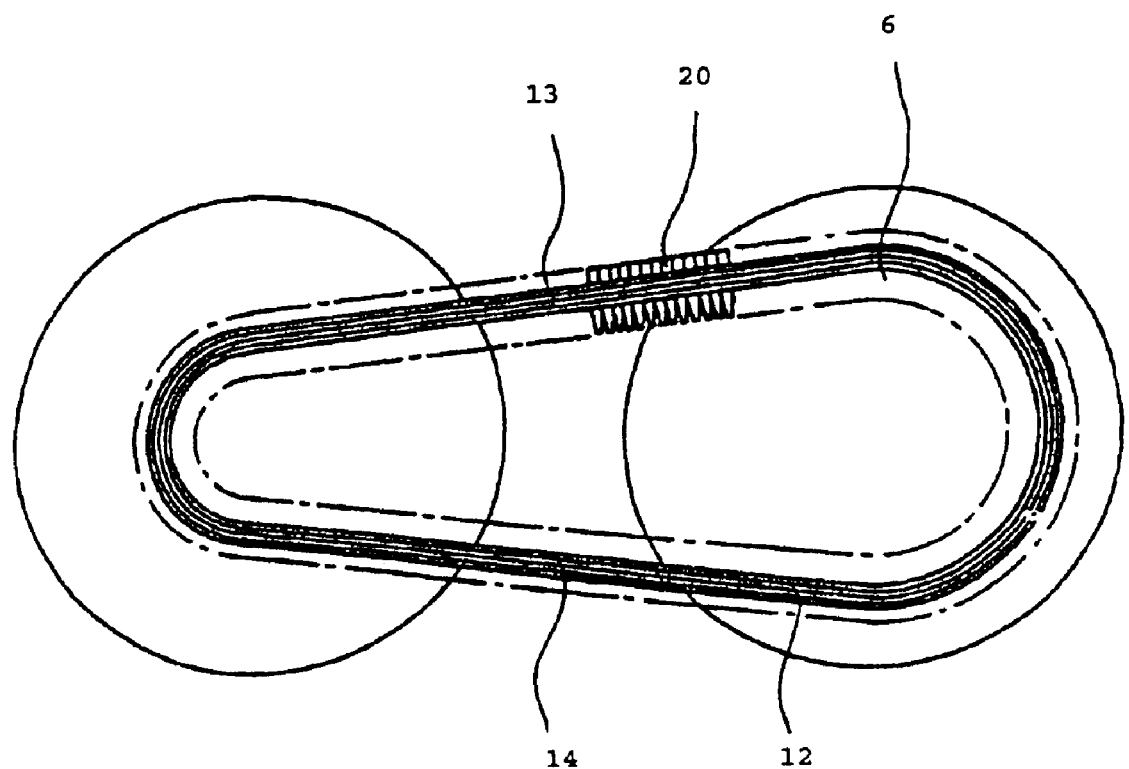
FIG. 2 is a diagrammatical longitudinal view of a portion of the transmission having the drive belt, which is shown in FIG. 1.
Figure 3:
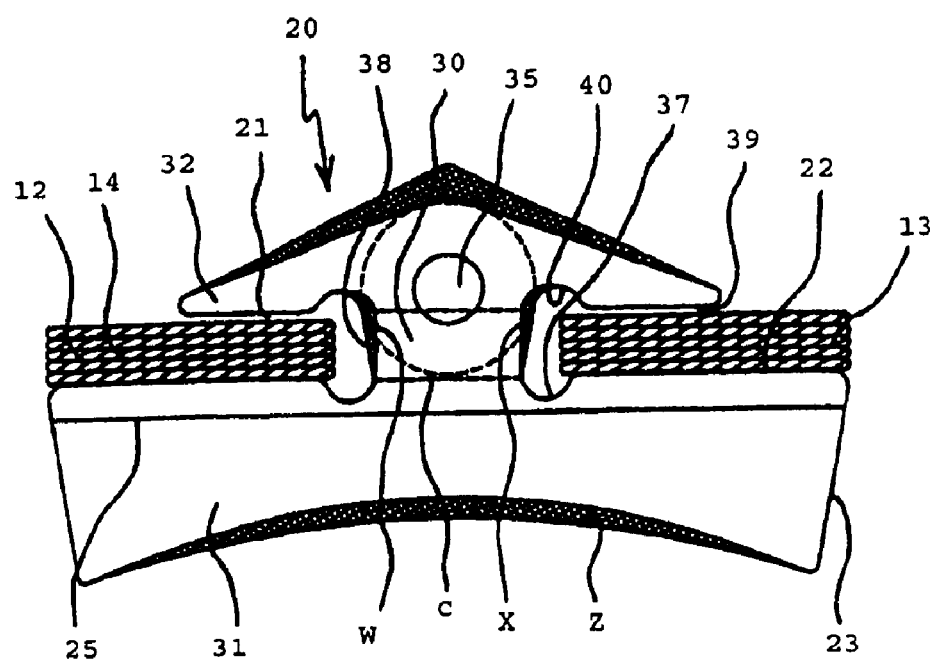
FIG. 3 is a transverse view of a transverse element according to the invention and carriers of the drive belt.

In FIGS. 2 and 3, the drive belt 6 is depicted in more detail. The drive belt 6 comprises two endless carriers 12 being disposed next to each other, which in this example are each composed of a number of bands 13 forming a bundle of bands 14. Along the entire length of the carriers 12, transverse elements 20 are arranged, wherein the transverse elements 20 are mutually adjacent to each other and are movable in axial direction relative to the carriers 12. For the sake of the simplicity, in FIG. 2 only a few of these transverse elements 20 are shown.

In FIG. 3, the carriers 12 and the transverse element 20 are depicted in transverse view. The transverse element 20 is on both sides provided with recesses 21 in which the bundles of bands 14 are partially received. Moreover, the transverse element 20 comprises on both sides supporting surfaces 22 on which the bundles of bands 14 are supported.

Furthermore, the transverse element 20 comprises on both sides pulley sheave contact surfaces 23. When the transverse element 20 is inside the receiving groove 11, contact between the transverse element 20 and a contact surface of the pulley sheave 7, 8, 9, 10 is established through the pulley sheave contact surface 23.

The portion of the transverse element 20 being situated between the highest point of the surface 22 and the lowest point of the surface 39, being depicted by discontinuous lines in the figure, is indicated in the following as neck portion 30. The portion of the transverse element 20 being situated below the neck portion 30 in FIG. 3, is indicated in the following as inner portion 31. The inner portion 31 comprises the supporting surfaces 22 and the pulley sheave contact surfaces 23, and is located at the inner circumference of the drive belt 6 on utilisation of the transverse element 20 in the drive belt 6. The portion of the transverse element 20 being situated above the neck portion 30 in FIG. 3, is indicated in the following as outer portion 32. The outer portion 32 is located at the outer circumference of the drive belt 6 on utilisation of the transverse element 20 in the drive belt 6.

Figure 4:
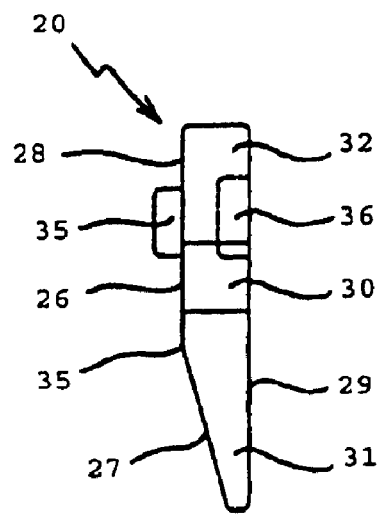
FIG. 4 is a longitudinal view of the transverse element which is shown in FIG. 3.

Two subsequent transverse elements 20 are tiltable relative to each other about a contact line 25. As is shown in FIG. 4, the contact line 25 is situated at the position where a slanting portion 27 of a front surface 26 of the transverse element 20 is connected to a straight portion 28 of the front surface 26. When transverse elements 20 move through, for example, the receiving groove 11 in one of the pulleys 4, 5 during a movement of the drive belt 6, the mutual contact between two subsequent transverse elements 20 is guaranteed along the contact line 25.

A projection 35 is arranged on the front surface 26. In this example the projection 35 is cylindrical. A hole 36 is arranged in a back surface 29. The dimensions and the positions of the projection 35 and the hole 36 are adapted to each other in such a way that the projection 35 of a transverse element 20 can be received by the hole 36 of a subsequent transverse element 20. An important function of the projection 35 and the hole 36 is preventing a mutual displacement of subsequent transverse elements 20 which are part of the drive belt 6.

Both the projection 35 and the hole 36 are preferably formed by means of a die and a mould (not shown), like for example a punching process. In the process, a certain surface surrounding the projection 35 and the hole 36 is necessary for being able to obtain a sufficiently strong die and mould and for being able to sufficiently support the transverse element 20 during the formation of the projection 35 and the hole 36. Moreover, the transverse element 20 needs to posses a certain strength being suitable for utilisation thereof in the drive belt 6.

The delimitation of this fixture surface is diagrammatically depicted by means of the dashed line being indicated by c in FIG. 3. In this example, the delimitation c has the shape of a circle, wherein the circle touches the side surfaces 38 of the neck portion 30 and an outer surface of the outer portion 32. The position of the circle is chosen such that its diameter can be as large as possible. Preferably, the projection 35 and the hole 36 are positioned substantially in the centre of the circular fixture surface.

As can clearly be seen in FIG. 3, a supporting surface 22 is connected to a side surface 38 of the neck portion 30, through a lower transition region 37. The lower transition region 37 comprises a portion being deepened relative to the supporting surface 22. An important function of the lower transition region 37 is preventing of the bundle of bands 14 of the drive belt 6 being able to come in contact with the side surface 38 of the neck portion 30. Because of the lower transition region 37 being executed as a deepened portion of the supporting surface 22, a surface along which the bundle of bands 14 could creep in the direction of the neck portion 30 is absent at the side of the neck portion 30. Preventing of contact between the bands 13 and the neck portion 30 is very important, because such a contact can be harmful to the bands 13 and the chance of breaking of the bands 13 can increase as a result thereof.

The outer portion 32 comprises an upper surface 39 being part of the inner surface of the recess 21. The upper surface 39 is connected to the side surface 38 of the neck portion 30, through an upper transition region 40, wherein the upper transition region 40, in this example, comprises a portion being deepened relative to the upper surface 39. When the neck portion 30 needs to be processed utilising a grinding belt during the manufacturing of the transverse element 20, a layout of the upper transition region 40 having a deepened portion relative to the upper surface 39 is important as regards the space being needed for that purpose. In case of the transverse element 20 needing to be submitted to a tumbling process during the manufacturing, the upper transition region 40 in the shape of a deepened portion relative to the upper surface 39 can be left out.

Figure 5:
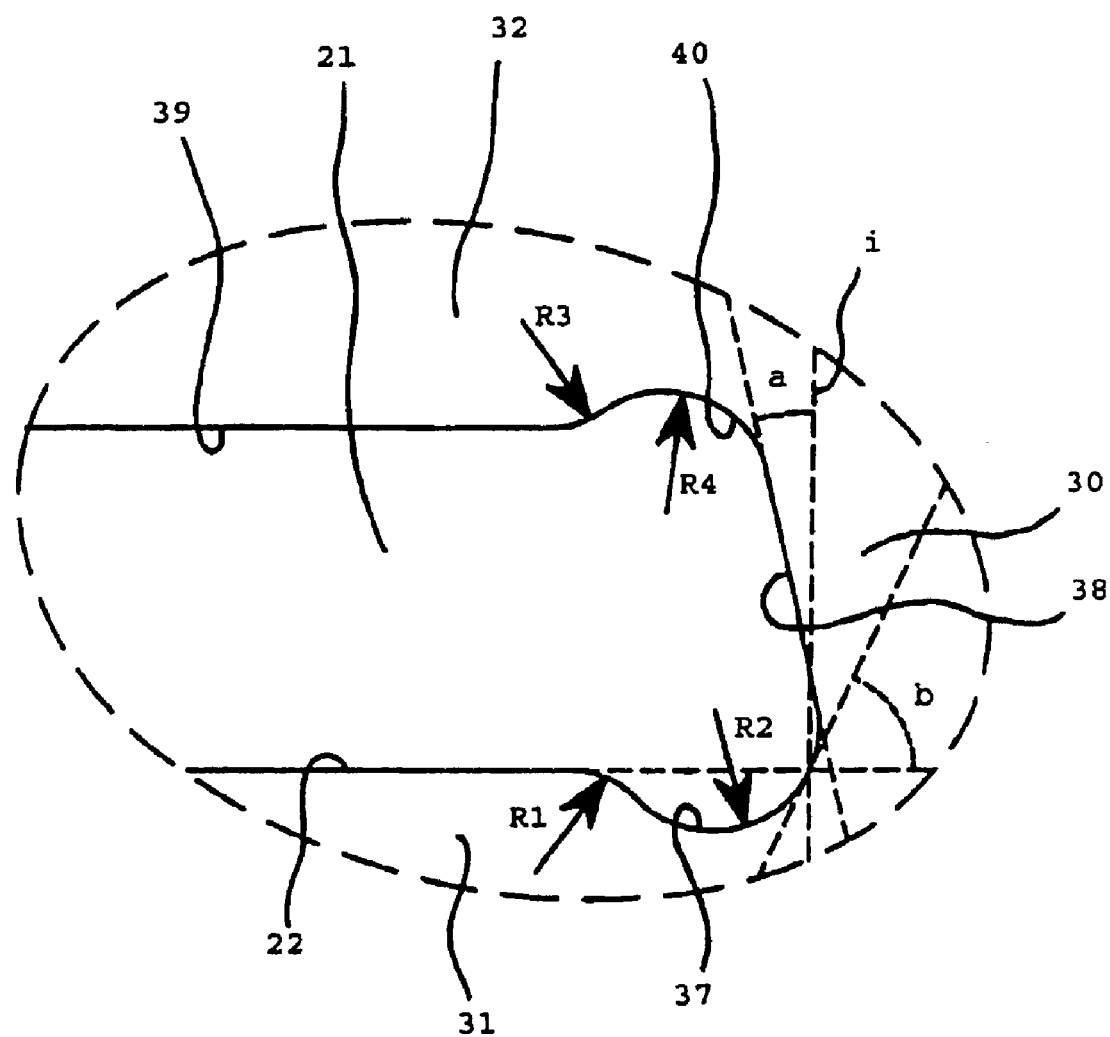
FIG. 5 is a detail of the transverse element which is shown in FIG. 3.

FIG. 5 is a detail of the transverse element 20, wherein a portion of the supporting surface 22, the lower transition region 37, the side surface 38 of the neck portion 30, a portion of the upper surface 39 and the upper transition region 40 are shown.

In this example, the lower transition region 37 comprises a convex portion having a radius R1, at the side of the supporting surface 22. Furthermore, the lower transition region 37 comprises a concave portion having a radius R2. In a similar manner, the upper transition region 40 comprises a convex portion having a radius R3 and a concave portion having a radius R4, at the side of the upper surface 39.

Preferably, a value of 0.4 mm or more is chosen for radius R1. The fact is, it has appeared in practice that at a value lower than 0.4 mm damage or overload of the inner band 13 of the bundle of bands 14 can occur. Also, the radius R2 of the concave portion needs to be sufficiently large. By choosing a value higher than 0.7 mm for radius R2, the chance of breaking of the transverse element 20 is reduced. The value of radius R3 is preferably chosen to be the same as the value of radius R1, while the value of radius R4 is preferably chosen to be the same as the value of radius R2.

In FIG. 5, an angle is indicated by a, which according to the invention is present between the side surface 38 of the neck portion 34) and an imaginary line i being orientated perpendicular to the supporting surface 22. Preferably, the side surface 38 extends parallel relative to the pulley sheave contact surface 23 being situated at the same side of the transverse element 20. In practice, the angle a has a value of 11°. It is also possible to shape the side surface 38 in a curved way, wherein the side surface 38 preferably has a relatively large radius, such that a smooth connection to the lower transition region 37 and the upper transition region 40 is obtained.

Figure 7:
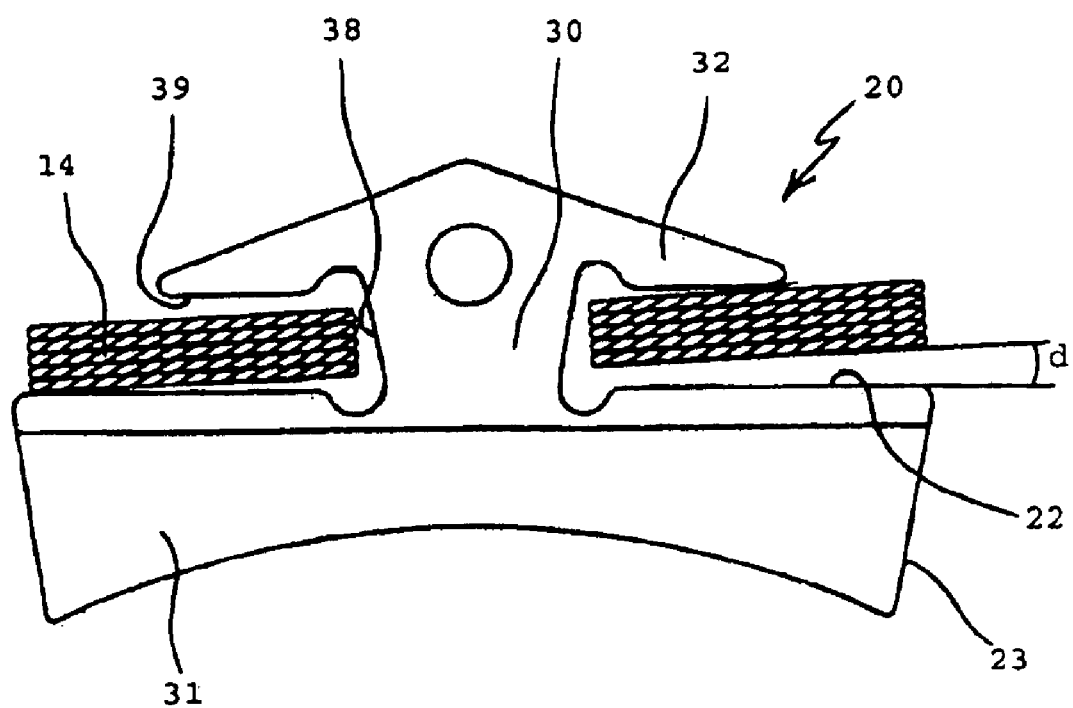
FIG. 7 is a transverse view of a transverse element and carriers of a drive belt, wherein the carriers are at a maximum angular displacement in transverse direction.

During operation of the continuously variable transmission 1, an angular displacement of the bundles of bands 14 relative to the supporting surfaces 22 can occur. This angular displacement is delimited by the upper surface 39 of the outer portion 32. FIG. 7 illustrates a situation in which the angular displacement is at a maximum. Preferably, the angle a is unequal to an angle being present between the bundles of bands 14 at the maximum angular displacement in transverse direction and the supporting surfaces 22, which angle is indicated by d in FIG. 7. The angle d is usually approximately 1° to 2°. Preferably, the angle a is larger than the angle d being present between the bundles of bands 14 at a maximum angular displacement in transverse direction and the supporting surfaces 22, wherein a side surface 38 of the neck portion 30 and a pulley sheave contact surface 23 being situated at one side of the transverse element 20 extend substantially parallel relative to each other, or wherein the side surface 38 and the pulley sheave contact surface 23 are at a relatively small angle with each other, for example an angle of 3°.

In FIG. 5, an angle is indicated by b, which is present between the concave portion of the lower transition region 37 near the supporting surface 22 and the supporting surface 22. Preferably, angle b is smaller than 85°.

As already noted in the above, according to the invention, an angle a is present between the side surface 38 of the neck portion 30 and an imaginary line i being orientated perpendicular to the supporting surface 22. With this, the neck portion 30 tapers in the direction of the supporting surfaces 22.

In FIG. 3, by means of shaded portions W, X, Y and Z, insight is provided into the way in which, according to the invention, weight-saving of the transverse element 20 is achieved relative to a known transverse element having a neck portion of which the side surfaces extend parallel relative to each other, by means of the tapered layout of the neck portion 30. The portions W and X being located at both sides of the neck portion 30 are added relative to the known transverse element. As a result, the neck portion 30 at the side of the outer portion 32 is larger than the neck portion of the known transverse element. In the transverse element 20 according to the invention, this results in the possibility of the fixture surface for the purpose of punching of the projection 35 and the hole 36 being displaced in the direction of the inner portion 31. After all, the circular fixture surface touches the side surfaces 38 of the enlarged neck portion 30.

As the projection 35 and the hole 36 are preferably positioned substantially in the centre of the fixture surface, the projection 35 and the hole 36 can also be displaced in the direction of the inner portion 31. In FIG. 3 can be seen that the displacement of the projection 35 is such that the projection 35 is partially situated on the neck portion 30, while in the generally known transverse element, the projection is located solely on the outer portion. It is not essential that the projection 35 is situated partially on the neck portion 30; in any case, it is important that the projection 35 is displaced in the direction of the inner portion 31.

Due to the conical layout of the neck portion 30, the portions being indicated by W and X are added relative to the known transverse element. As a result of the above-described displacement of the fixture surface for the purpose of punching of the projection 35 and the hole 36, the portion of the outer portion 32 being indicated by Y can be left out. As regards the stability of the transverse element 20, it is then important to also leave out the portion of the inner portion 31 being indicated by Z. It is clear from FIG. 3 that the portions Y plus Z are larger than the portions W plus X, which means that weight-saving is achieved in the transverse element 20 according to the invention relative to the known transverse element.

It is not necessary that the entire neck portion 30 tapers. In any case, it is important that a substantial portion of the neck portion 30 at the side of the outer portion 32 is enlarged, by which the above-described displacement of the fixture service can be obtained.

Another advantageous result of the above-described displacement of the projection 35 and the hole 36 in the direction of the inner portion 31 is that the projection 35 and the hole 36 are situated closer to the contact line 25. Because of this, at unchanged dimensions of the projection 35, a better contact between subsequent transverse elements 20 is guaranteed, which especially is manifested when the transverse elements 20 are inside the receiving groove 11 of one of the pulleys 4, 5 and they are tilted relative to each other.

As a result of the conical layout of the neck portion 30, the chance is increased that a band 13 can come in contact with the side surface 38 of the neck portion 30. This is especially true for the upper band 13 of the bundle of bands 14, wherein the distance between the band 13 and the side surface 38 is the smallest. In the following, two measures are being described, with which the result of the conicity of the neck portion 30 can be neutralized.

A first measure relates to adapting the layout of the supporting surface 22. Advantageously, the supporting surface 22 is not shaped in a totally flat way, but has a slightly convex layout, as a result of which the bundle of bands 14 will centre itself on the supporting surface 22 during operation of the continuously variable transmission 1.

Figure 6:
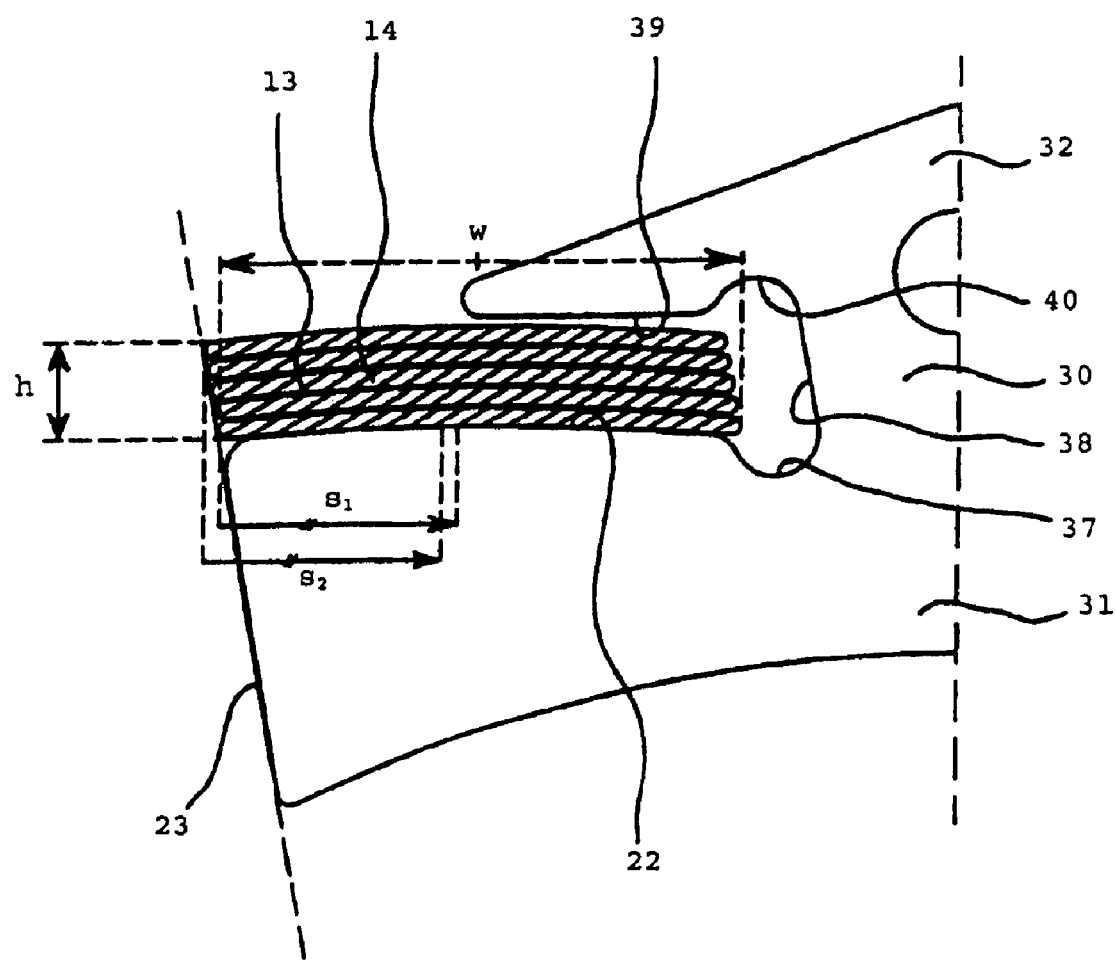
FIG. 6 is a transverse view of a portion of the transverse element according to the invention and a carrier of the drive belt.

In a known transverse element being provided with a neck portion 30 of which the side surfaces 38 extend substantially parallel relative to each other, the position of the highest point of the curvature of the supporting surface 22 is determined with the help of the following formula:

$$s_1 \approx \frac{1}{2} * w - f$$

wherein reference is made to FIG. 6 and in which:

s represents the distance being present near the highest point of the curvature of the supporting surface 22 between the highest point and the surface being defined by the pulley sheave contact surface 23;

w represents the transverse dimension of the bands 13; and f represents an empirical factor relating to the optimum abutment of the bundle of bands 14 against the contact surface of a pulley sheave 7, 8, 9, 10.

The value of the empirical factor f is preferably between 0.0 mm and 0.2 mm. Usually, a value of 0.1 mm is utilised for this factor.

Advantageously, in the transverse element 20 according to the invention, another formula is utilised for the determination of the position of the highest point of the curvature of the supporting surface 22. This formula is as follows:

$$s_2 \approx \frac{1}{2} * w - f - \tan(\frac{1}{2} * p) * h$$

wherein reference is made to FIG. 6 and in which p represents the angle (not depicted) being enclosed by the two pulley sheave contact surfaces 23 of the transverse element 20; and h represents the height of the bundle of bands 14.

Usually, the value of the angle p is 22°.

It appears from a mutual comparison of the two formulae that with the transverse element 20 according to the invention, the highest point of the curvature of the supporting surface 22 is displaced along a distance having a size of $\tan(\frac{1}{2}*p)*h$ in the direction of the surface being defined by the pulley sheave contact surface 23. As a result, during operation of the continuously variable transmission 1, the bundle of bands 14 will centre itself on the supporting surface 22 in such a way that a configuration of the bundle of bands 14 as shown in FIG. 6 is obtained. In this configuration, the distance between all bands 13 of the bundle of bands 14 and the side surface 38 of the neck portion 30 is optimal, i.e. as large as possible, as all bands 13 abut against the contact surface of a pulley sheave 7, 8, 9, 10 in an optimal way when the transverse element 20 is inside the receiving groove 11 of a pulley 4, 5.

A second measure (not illustrated) relates to adapting the layout of the bundle of bands 14. A substantially pyramid-shaped bundle of bands 14 can be applied, wherein the transverse dimension of the inner band 13 is the largest, and wherein the transverse dimension of the outer band 13 is the smallest. Such a bundle of bands 14 can be manufactured in a simple manner, because all bands 13 are formed from base rings of equal dimensions by means of rolling. When an equal height is adopted for the bands 13, a band 13 having a larger circumference shall get a smaller transverse dimension than a band 13 having a smaller circumference.

It will be clear to the person skilled in the art that the scope of the present invention is not limited to the examples discussed above, but that several amendments and modifications thereof are possible without deviating from the scope of the invention as defined in the appended claims.

What is claimed is:

1. Transverse element for a drive belt for a continuously variable transmission having two pulleys having an at least partially conical contact surface which is designed for contacting opposite sides of the drive belt, wherein each pulley includes two pulley sheaves, wherein the drive belt comprises two endless carriers and transverse elements which are placed against each other in axial direction of the drive belt, wherein the transverse elements are provided with two supporting surfaces for supporting a carrier, wherein each supporting surface turns into a pulley sheave contact surface being designed to abut against a contact surface of a pulley sheave on the one side, and into a side surface of a neck portion of the transverse element on the other side, through a transition region, wherein at least a portion of the neck portion tapers towards the supporting surfaces, such that the neck portion has a smallest transverse dimension near the supporting surfaces, and wherein an angle being present between a side surface of the neck portion and an imaginary line being orientated perpendicular to the adjacent supporting surface is larger than an angle being present between the carriers at a maximum angular displacement in transverse direction and the supporting surface.

2. Transverse element according to claim 1, wherein a side surface of the neck portion and a pulley sheave contact surface being situated at one side of the transverse element extend parallel relative to each other.

3. Transverse element according to claim 1, wherein a projection is arranged on a front surface of the transverse element, wherein the projection is positioned substantially in the centre of an imaginary circle inside the front surface, wherein the imaginary circle at least touches one of the side surfaces of the neck portion and upper transition regions extending from the side surfaces, while having a diameter which is as large as possible.

4. Transverse element according to claim 1, wherein a cylindrical projection is arranged on a front surface of the transverse element, wherein a part of the projection is located on an outer portion of the transverse element, and wherein a part of the projection is located on the neck portion of the transverse element.

5. Transverse element according to claim 1, wherein a cylindrical hole is arranged in a back surface of the transverse element, wherein a part of the hole is located on an outer portion of the transverse clement, and wherein a part of the hole is located on the neck portion of the transverse element.

6. Transverse element according to claim 1, wherein the supporting surface is convex, wherein the position of a highest point of the supporting surface is determined with the help of the following formula:

$$s \approx \frac{1}{2}*w - f - \tan(\frac{1}{2}*P)*h$$

wherein:

s represents the distance being present near the highest point of the curvature of the supporting surface between the highest point and the surface being defined by the pulley sheave contact surface; w represents the transverse dimension of the carrier; f represents an empirical factor relating to the optimum abutment of the bundle of the carrier against the contact surface of a pulley sheave; p represents the angle being enclosed by the pulley sheave contact surfaces of the transverse element; and h represents the height of the bundle of the carrier.

7. Drive belt for a continuously variable transmission having two pulleys having an at least partially conical contact surface which is designed for contacting opposite sides of the drive belt, wherein each pulley includes two pulley sheaves, wherein the drive belt comprises two endless carriers and transverse elements according to claim 1, and wherein the transverse elements are placed against each other in axial direction of the drive belt.

8. Continuously variable transmission being provided with a drive belt according to claim 7.

* * * * *